April 27, 1948.                F. E. BEST                2,440,434
                             SYSTEM OF LOCKS,
              Original Filed Jan. 8, 1942    6 Sheets-Sheet 1
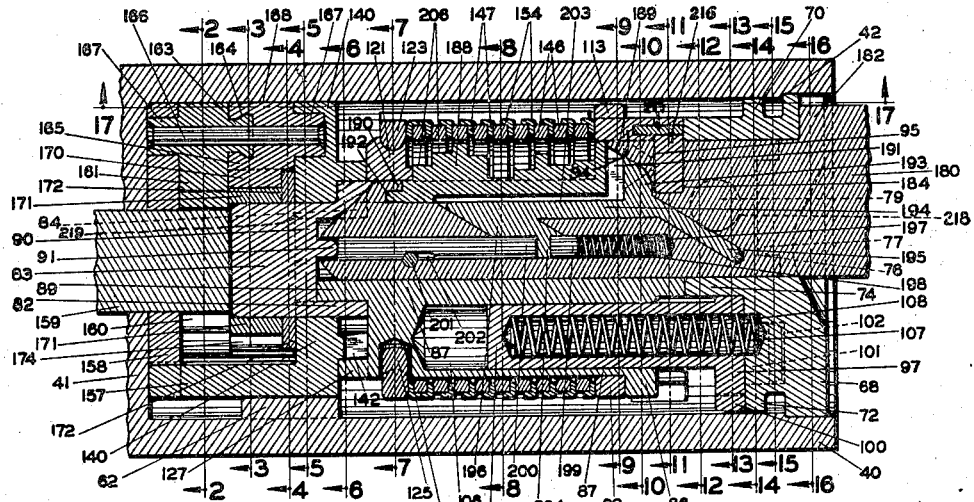
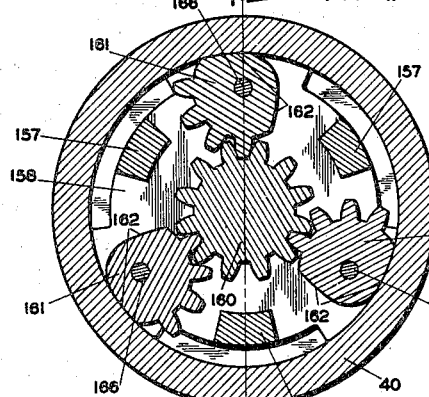
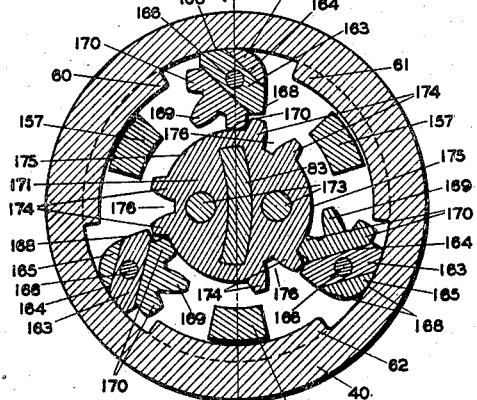
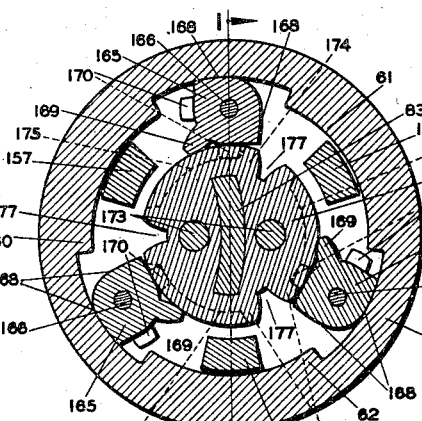
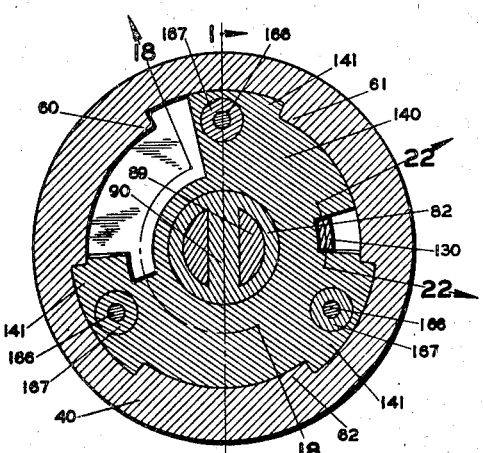
Frank Ellison Best  INVENTOR.

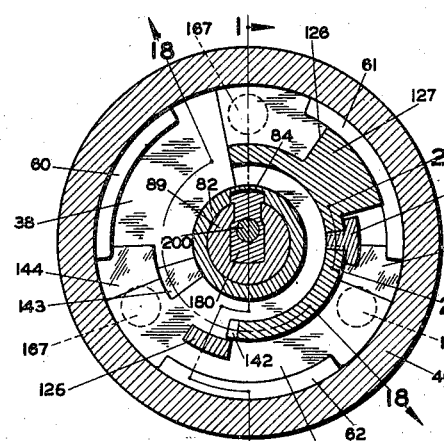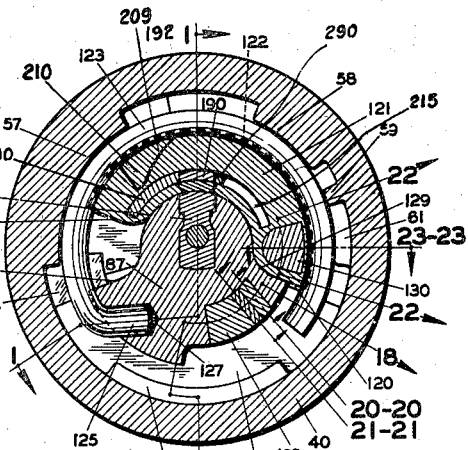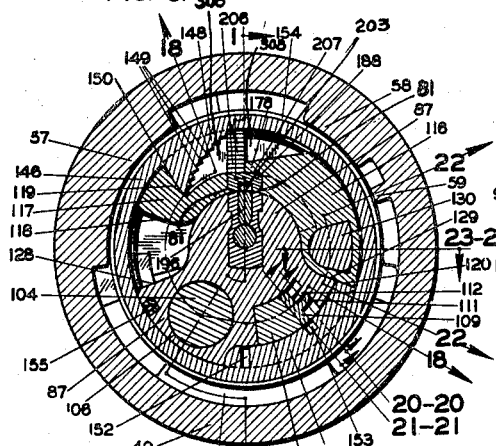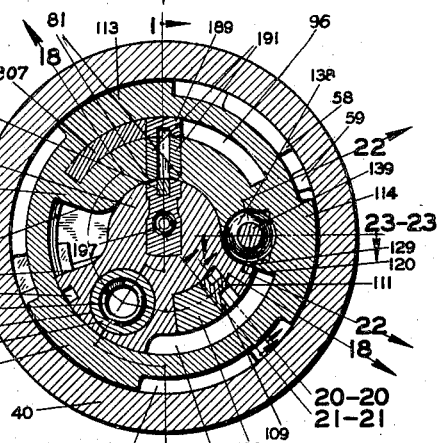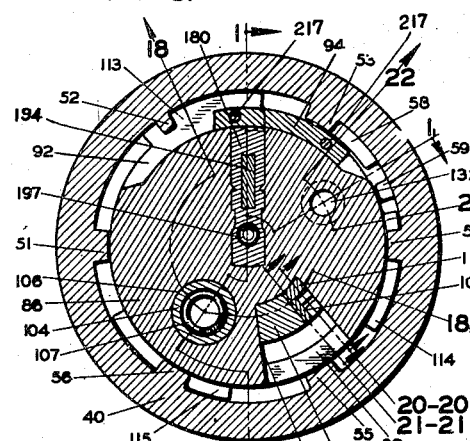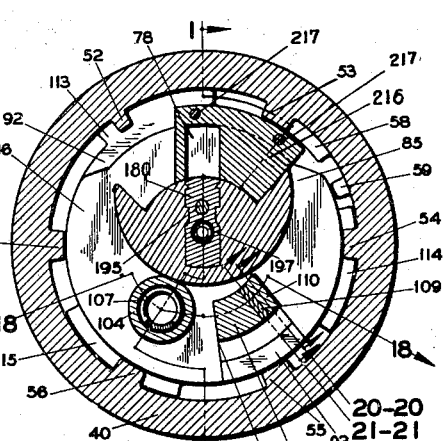

April 27, 1948.　　　F. E. BEST　　　2,440,434
SYSTEM OF LOCKS
Original Filed Jan. 8, 1942　　6 Sheets-Sheet 3

Frank Ellison Best
INVENTOR.

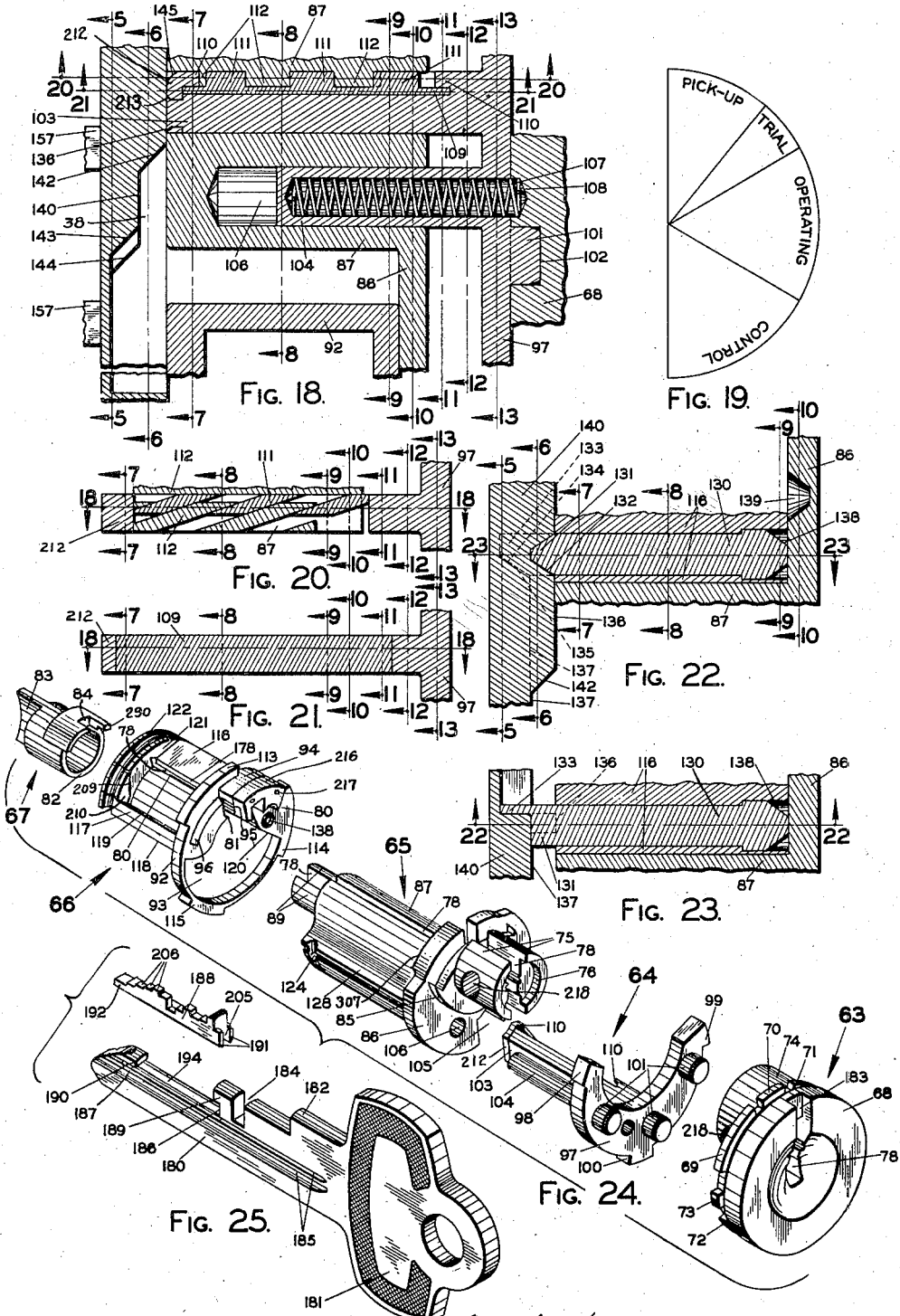

April 27, 1948.   F. E. BEST   2,440,434
SYSTEM OF LOCKS
Original Filed Jan. 8, 1942   6 Sheets-Sheet 5

Frank Ellison Best   INVENTOR.

April 27, 1948.　　　　F. E. BEST　　　2,440,434
SYSTEM OF LOCKS
Original Filed Jan. 8, 1942　　6 Sheets-Sheet 6
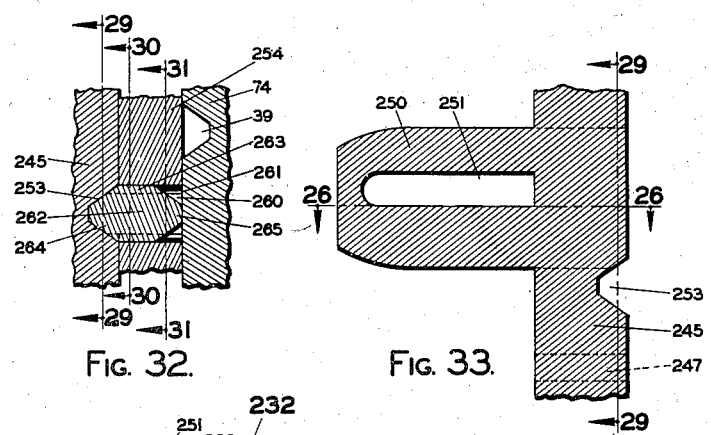
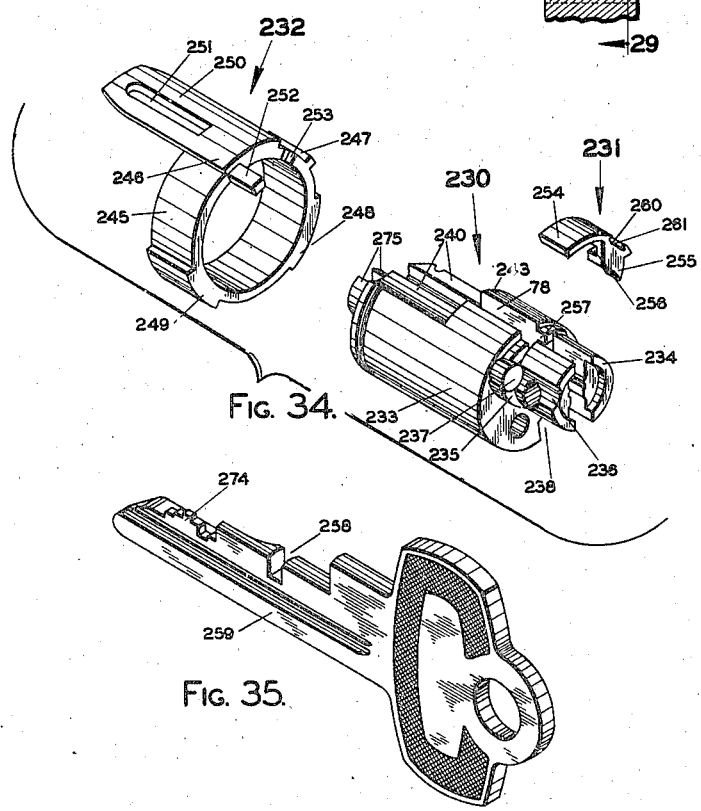
Frank Ellison Best
INVENTOR.

Patented Apr. 27, 1948

2,440,434

UNITED STATES PATENT OFFICE 2,440,434

SYSTEM OF LOCKS

Frank Ellison Best, Indianapolis, Ind.

Original application January 8, 1942, Serial No. 425,952. Divided and this application January 15, 1945, Serial No. 572,907

19 Claims. (Cl. 70—369)

Nature and objects

This is a divisional application of my co-pending application on Unpickable lock, filed January 8, 1942, Serial No. 425,952, now abandoned.

This invention relates to masterkeyable and master-keyed systems of locks and more particularly to such systems employing the lock-controlled assembly feature in which interchangeable cores, comprising the primary lock mechanisms of the system, are lockable into and unlockable from core receptacles in housings, by key means, said housings comprising the core receptacles and the complementary secondary lock mechanisms of the system.

The principal object of this invention is to provide, in such a system of locks, having a variety of types of lock housings for a variety of applications, all said housings having common core reception features and all being adapted to operatively respond to common core functioning therein, a plurality of structurally dissimilar types of core all interchangeable in, and all adapted to similarly function in, said housings, and to respond to the same control and master keys.

Another object is to provide such a system of locks in which it is impossible for an unauthorized person to determine the combination of the master key or control key of the system by dismantling a number of locks of the system and examining the combination settings or configurations of the tumblers thereof.

Still another object is to provide such a system in which structurally dissimilar i. e., patentally distinguishable types of lock cores require structurally dissimilar types of keys; and in which one type of key will function only in one type of cores while another type of key will function in a plurality of types of cores all within the same master-keyed system of locks.

This invention pioneers a basically new art in locks defined as:

In locks, in lock controlled assembly, structurally different cores adapted to interchangeably complement the same housing.

Description of figures

I accomplish these and other objects by means illustrated in the accompanying drawings in which Figures 1 to 25 inclusive show one form of lock core in a representative housing and Figures 26 to 35 inclusive show another form of lock core adapted to be used interchangeably with the first housings having common core reception features.

More specifically, Figure 1 is a view in longitudinal section taken substantially on broken lines 1—1, of Figures 2 to 17 inclusive, showing a representative core and housing of a system of locks constructed in accordance with my invention with the key inserted in the lock core in the position it would occupy preparatory to operating the lock core mechanism.

Figure 2 is a cross section taken on broken line 2—2 of Fig. 1.

Fig. 3 is a cross section taken on broken line 3—3 of Fig. 1.

Figure 4 is a cross section taken on broken line 4—4 of Fig. 1.

Fig. 5 is a cross section taken on broken lines 5—5 of Figs. 1, 18 and 22.

Figure 6 is a cross section taken on broken lines 6—6 of Figs. 1, 18 and 22.

Figure 7 is a cross section taken on broken lines 7—7 of Figs. 1, 18, 20, 21 and 22.

Figure 8 is a cross section taken on broken lines 8—8 of Figs. 1, 18, 20, 21 and 22.

Figure 9 is a cross section taken on broken lines 9—9 of Figs. 1, 18, 20, 21 and 22.

Figure 10 is a cross section taken on broken lines 10—10 of Figures 1, 18, 20 and 21 and 22.

Figure 11 is a cross section taken on broken lines 11—11 of Fig. 1, 18, 20 and 21.

Figure 18 is a fragmentary sectional development taken on broken lines 18—18 of Figs. 5, 6, 7, 8, 9, 10, 11, 12, 13, 14, 20 and 21.

Figure 19 is a diagram illustrating the cycle of operation of the key in this lock.

Figure 20 is a fragmentary sectional development taken on broken line 20—20 of Figs. 7, 8, 9, 10, 11 and 18.

Figure 21 is a fragmentary sectional development taken on broken line 21—21 of Figures 7, 8, 9, 10, 11 and 18.

Figure 22 is a fragmentary sectional development taken on broken lines 22—22 of Figs. 5, 6, 7, 8, 9, 10 and 23.

Figure 23 is a fragmentary sectional development taken on broken line 23—23 of Figs. 7, 8, 9 and 22.

Figure 24 is an exploded isometric view showing a plurality of the operating parts of this lock core mechanism.

Figure 25 is an exploded isometric view showing a key and a separable key bit in relatively separated relation.

Figure 32 is a fragmentary sectional development taken on broken lines 32—32 of Figs. 26, 30 and 31.

Figure 33 is a sectional development taken on broken line 33—33 of Fig. 26.

Figure 34 is an exploded isometric view of parts of the lock core mechanism shown in Figs. 26 to 33.

Figure 35 is an isometric view of a key used in the lock core shown in Figs. 26 to 34 inclusive.

Like reference numerals designate like parts throughout the several views.

Structural description Figs. 1 to 25

Figs. 1 to 25 inclusive disclose a lock comprising a lock housing, a lock core and a key adapted for cooperation with said lock, said key having a combinated portion, herein termed the key bit, that is detachable from the body portion of the key, herein termed the key blade. The primary lock mechanism shown to the right of the end plate 140, in Fig. 1, constitutes the lock core, the skeleton of which is shown exploded in Fig 24.

Figure 17:
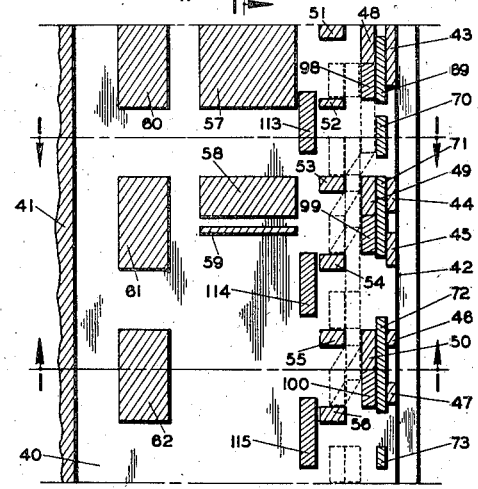
Figure 17 is a sectional development taken on broken line 17—17 of Fig. 1 and on a smaller scale than the preceding figures, a portion of the face plate of the lock being omitted.

Figs. 1 to 17 inclusive show the cylindrical lock core housing 40 that is open at the outer end and preferably has an integral or rigidly connected end wall 41, Figs. 1 and 17.

Preferably the housing 40 is internally provided adjacent the outer end with an annular shoulder 42, Figs. 1 and 17, for supporting a disc portion 68 of the face member 63 of a lock core, as hereinafter described.

Five annular rows of inwardly projecting rigid lugs are provided in the housing 40 with the outermost or first annular row of lugs positioned near the open end of said housing and each succeeding annular row of lugs spaced from the proceeding annular row longitudinally of the housing. These annular rows of lugs are best shown in the sectional development, Fig. 17.

The first row of lugs, shown at the right in Fig. 17, are numbered 43, 44, 45, 46 and 47 respectively; the second row of lugs are numbered 48, 49 and 50 respectively; the third row of lugs are numbered 51, 52, 53, 54, 55 and 56 respectively; the fourth row of lugs are numbered 57, 58 and 59 respectively; and the fifth row of lugs are numbered 60, 61 and 62 respectively. The functions of the lugs 43 to 62 inclusive are hereinafter fully described.

The skeleton of the core mechanism, see Fig. 24, comprises a face member 63, a longitudinally bolt member 64, an inner body member 65, an outer body member 66 and a throw member 67. The numerals 63, 64, 65, 66 and 67 designate these members generally in Fig. 24. Said members are shown in exploded relation in Fig. 24 and in telescoped or assembled relation in Fig. 1. Each of said members is made up of a number of related parts or portions and the tumbler, which are preferably of the ring-plate type, are assembled on the members 65 and 66 after these parts have been telescoped together, as hereinafter explained.

The face member 63 is preferably of one piece construction to provide great strength and offer great resistance to the application of force used for the purpose of destroying the lock or gaining access through it.

This face member 63 comprises a disc portion 68 of large enough diameter to seat against the shoulder 42. The disc portion 68 is omitted in Fig. 17 to avoid confusion. An annular row of individually spaced apart outwardly protruding lugs 69, 70, 71, 72 and 73, see Figs. 1, 14, 17 and 24, are rigid with the face member 63 and spaced inwardly from the disc portion 68 a distance at least slightly more than the width of the housing lugs 43 to 47 so that they may be engaged back of the housing lugs 43 to 47 when the disc portion 68 rests against the shoulder 42 and is against or closely adjacent to the lugs 43 to 47 inclusive.

The face member 63 is provided, on the inner side, with a tubular sleeve 74 that is adapted to fit over a shank 75 on the end of the inner body member 65, see Figs. 1, 12, 13, 14, 15 and 24. Preferably the outer end of the shank 75 has a counterbore 76 therein, Fig. 24, that fits over a cylindrical bearing portion 77, Fig. 15, which is formed within the sleeve 74, see also dotted lines, Fig. 1.

This counterbore 76 and bearing portion 77 help to provide a better bearing and particularly cooperate to prevent the two side portions of the shank 75, which are separated by a keyway 78, from being pinched together. Dowel pins 79 in holes 218 secure the relatively telescopic sleeve 74 and shank 75 together, see Figs. 1, 12, 13 and 24, the holes for these dowel pins being shown in Fig. 24.

The keyway 78 extends through the face member 63 and inner body member 65 and is similarly numbered in these two parts. The cross sectional shape of this keyway may be varied to conform to the cross sectional shape of the keys to be used.

A portion 80 of the keyway is formed in the outer body member 66. This portion 80 is separately numbered and has inwardly projecting ribs 81 at the location where it intersects the lower curved surface of the outer body member 66, see Figs. 8, 9 and 24.

A stepped portion 85 is provided on an end flange 86 of the inner body member 65 and around the base of the shank 75, see Figs. 24 and 11. The inner end of the sleeve 74 abuts against this stepped portion 85 and plate 216 of outer body member 66 when the members 66, 65, 64 and 63 are in assembled relation. The stepped portion 85 is shown in section in Fig. 11 and the end flange 86 is shown in elevation in Fig. 11 and in section in Fig. 10.

The inner body member 65 has a tumbler-carrying portion 87 that is rigid with the end flange 86 and extends inwardly therefrom. The portion 87 is of the general cross-sectional shape shown in Figs. 7, 8 and 9 throughout the major portion of its length.

End flange 86 has a rear arcuate projection 307 that is rectangular in cross-section adapted to form-fit rectangular arcuate groove 96 in circular end portion 92 of outer body member 66, Figs. 9 and 24.

Two-pronged shank 89 (of member 65, Fig. 24), which is divided into prongs by keyway 78, protrudes from the inner end portion of the tumbler-carrying portion 87 and is adapted to telescope into two mating holes extending lengthwise through the tubular portion 82 of throw member 67.

The metal forming the juncture of these holes with the flat surface at their innermost end is rounded off slightly so that each prong of shank 89 may be peened, in assembly, to fill the cavity thus formed as at 219, Fig. 1, to thus secure the assembled parts in rigid integrality as by riveting.

A rib 90, see Figs. 1 and 5, is provided in the bottom of the tubular portion 82 to enter between the two parts of shank 89 for a short distance and support the two parts of shank 89 and the adjacent parts of the tumbler-carrying portion 87 against collapse or sidewise crushing pressures which might tend to relatively displace these parts. An integral pin 91 is provided on the rib 90 for purposes hereinafter explained.

The outer body member 66, Fig. 24, has a circular end portion 92 that has a large opening 93 therethrough to receive the inner body member 65. A lug 94 projects outwardly from the end portion 92 and is notched on its under side to form a shoulder 95. A groove 96 is provided in the end portion 92 and extends under the lug 94. The function of parts 94, 95 and 96 are hereinafter explained in connection with the operation of key means.

Figure 12:
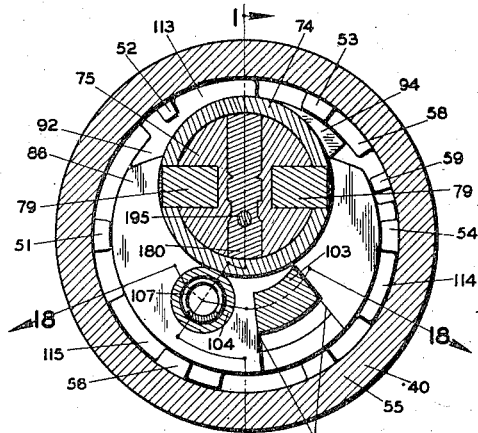
Figure 12 is a cross section taken on broken lines 12—12 of Figs. 1, 18, 20 and 21.
Figure 13:
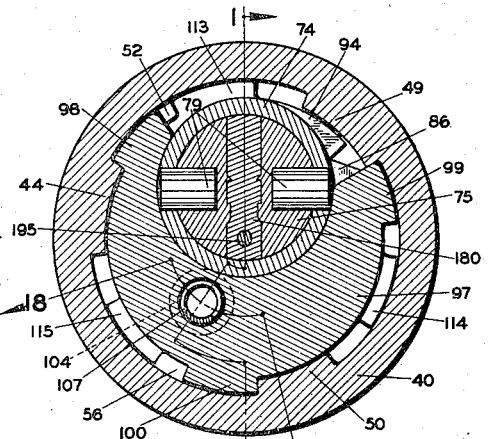
Figure 13 is a cross section taken on broken lines 13—13 of Figs. 1, 18, 20 and 21.
Figure 14:
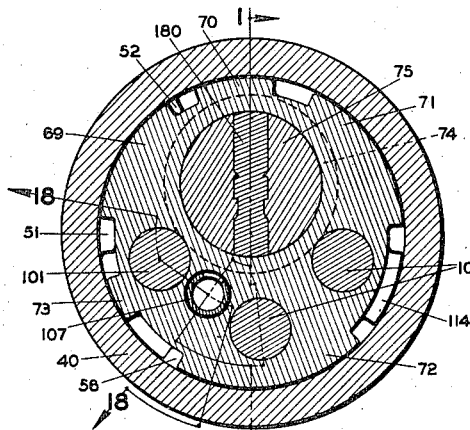
Figure 14 is a cross section taken on broken line 14—14 of Fig. 1.
Figure 15:
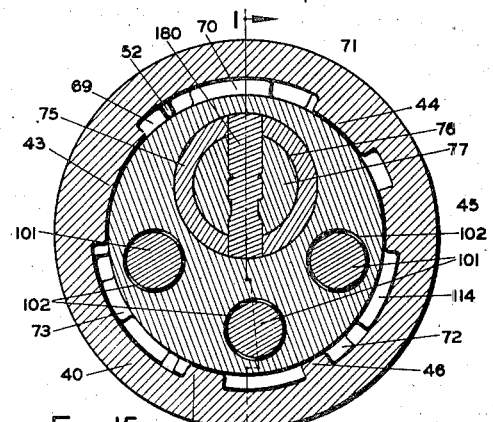
Figure 15 is a cross section taken on broken line 15—15 of Fig. 1.
Figure 16:
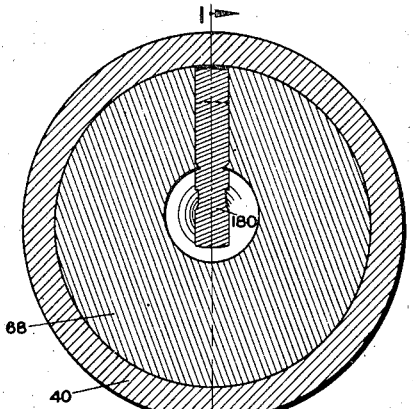
Figure 16 is a cross section taken on broken line 16—16 of Fig. 1.

The movable bolt member 64, comprises a crescent shaped end plate 97 that is provided with three lugs 98, 99 and 100 on its peripheral portion. The lugs 98, 99, 100, see Figs. 13, 17 and 24, are adapted to cooperate with the set of fixed housing lugs 48, 49 and 50 and the set of fixed housing lugs 51, 52, 53, 54, 55 and 56 in controlling rotary movement of the lock parts, as hereinafter explained.

The end plate 97 has a number of relatively large and strong pins 101 protruding outwardly therefrom that are adapted to fit within holes 102 in the face member 63, see Figs. 1, 14, 15 and 24, when the bolt member 64 is in a position adjacent the face member 63 as shown in Fig. 1. I have shown three of said pins 101 and have shown them to be integral with the end plate 97.

However, the number and shape of these pins 101 and the method of making them rigid with the plate 97 may be varied. The pins 101 form a very strong and rugged connection to resist torque and prevent said torque from being transmitted to the other parts of the lock in the event a screw driver or like instrument is inserted in the keyway 78 of the face member 63 and force applied to turn the same while the lugs 98, 99 and 100 are in engagement with the housing lugs 48, 49 and 50.

The end plate 97 of the part 64 carries an inwardly protruding rigid bar extension 103 and an inwardly protruding rigid tube 104. The bar extension 103 and tube 104 telescope into a notch 105 and a bore 106 respectively in the inner body member 65 when the lock parts are in assembled relation, see Figs. 1, 7, 8, 9, 10, 11 and 24. The tube 104 has a compression spring 107 therein. One end portion of the spring 107 seats in a recess 108, Fig. 1, in portion 68 of face member 63 and the other end portion of the spring 107 presses against the closed inner end portion of the tube 104. The spring 107 is thus caused to exert a yielding inward pressure on the movable bolt member 64 with the outer end portion of the spring abutting against the face member 63.

The bar extension 103, Figs. 7, 8, 9, 10, 11, 12, 18, 20, 21 and 24, is cut away on the right hand side, as respects the showing in Figs. 7 to 12 and 24, and carries an end piece 212 riveted thereto at 213, Fig. 18, to provide for the reception of a lock control bar 109. Parts 110 of the bar extension 103 and end piece 212 overhang the end portions of the lock control bar 109, see Figs. 18 and 24, for holding said lock control bar so that it may be moved transversely as respects the bar extension 103. Part 212 is riveted to bar extension 103 after members 64 and 65 are assembled.

The lock control bar 109 has inclined ribs 111 provided on the side thereof that is directed outwardly away from the bar extension 103 and the inclined ribs 111 are adapted to cooperate with inclined ribs 112 which are formed on the wall of the notch 105 in the inner body member 65, see Figs. 8, 18 and 20, so that when the bar extension 103 is moved longitudinally the lock control bar 109 will not only be moved longitudinally therewith but will also be moved transversely of the bar extension 103.

Also it is to be noted that transverse movement of the lock control bar 109 controls the longitudinal movement of the bar extension 103 and bolt member 64. Due to the cooperation of the inclined ribs 111 and 112 the transverse movement of the lock control bar 109 will always be a parallel movement and said lock control bar 109 will not be tilted or inclined because it is firmly held by and between the inclined ribs 112 which are rigid with the portion 87 of the inner body member 65. The function of the lock control bar 109 which makes this parallel movement of said lock control bar 109 necessary is hereinafter described in connection with the mechanism with which it cooperates.

The end portion 92 of the outer body member 66 has three lugs 113, 114 and 115 on its peripheral portion as shown in Figs. 1, 9, 10, 11, 17 and 24. The lugs 113, 114 and 115, Fig. 17, are positioned in an annular path between the set of housing lugs 51 to 56 inclusive and the set of housing lugs 57 to 59 inclusive. The lugs 113, 114 and 115 cooperate with housing lugs 51 to 56 inclusive and housing lugs 57, 58 and 59 to prevent endwise displacement of the outer body member 66 in the housing 40.

The outer body member 66 has a portion 116 extending inwardly from the end portion 92 and of a cross sectional shape as shown in Fig. 8. This body portion has an outwardly extending flange 117, shown at the left in Figs. 8 and 24, that is provided with two radial shoulders 118 and 119. Shoulder 118 engages with shoulder 120 of the portion 87 of the inner body member 65 while shoulder 119 engages with surfaces 150 of tumbler rings 146.

To the right of the shoulder 119 for a substantial distance, as respects the showing in Figs. 8 and 24, the portion 116 is cut away for a distance and then made wedge shaped to provide a key bit operating space 308, see Fig. 8, and to the right of this key bit operating space the body portion 116 is of uniform thickness and finally this thicker body portion terminates in a radial stop shoulder 120 positioned, preferably, diametrically opposite to the radial shoulder 118.

The portion 116 terminates at its inner end in a plate like portion 121 of substantially semicircular shape, see Figs. 1, 7 and 24. This plate like portion 121 has a notch 209 to facilitate assembly of tumblers 146, which notch may be filled, after the tumblers are in place, by a form-fitting block 210, which, in common with plate like portion 121, has a groove 122 in the peripheral portion for the reception of a resilient lock ring 123 preferably of ring type, Figs. 1 and 7. The body portion 87 of the inner body member 65 has a recess 124 to receive the inturned inner end portion 125 of the lock ring 123.

The portion 116 of the outer body member 66 has a longitudinally movable locking slide 130 provided therein, see Figs. 7, 8, 9, 22 and 23. The inner end portion 131 of the locking slide 130, shown at the left in Figs. 22 and 23, is of wedge-shape and is adapted to lock into a wedge-shaped recess 132 in end plate 140, see Figs. 22 and 6. An overhanging plate portion 133 is provided on the locking slide 130 at one side of the inner end portion 131. The plate portion 133 overhangs the portion 131 and projects beyond the end of the same, as shown in Figs. 22 and 23. One edge 134 of the plate portion 133 is inclined and is positioned in engagement with a cam surface 135, see Figs. 6 and 22, when the locking slide 130 occupies the position shown in Figs. 22 and 23. When the lock is in operation the locking slide 130, will at certain times, be moved to the right from the position shown in Figs. 22 and 23 so that the tip of the inner end portion 131 will follow a flat surface 136 and the tip of the plate portion 133 will follow a parallel flat surface 137, shown dotted in Fig. 22.

The outer end of the locking slide 130 has a frustro-conical end portion 138, that is adapted to lock into a correspondingly shaped recess 139 in the end flange 86 under certain operating conditions hereinafter described.

The end plate 140, see Figs. 1 and 5, has three spaced lugs 141 on its periphery. The lugs 141 fit between the housing lugs 60, 61 and 62 and prevent rotation of the end plate 140 in the housing.

In addition to the cam surface 135 the end plate 140 has two other inclined cam surfaces 142, 143 on the side thereof adjacent the lock mechanism, see Figs. 1, 6, 7, 18 and 22. The flat surface 136 cooperates with the end portion of end piece 212 carried by the bar extension 103 to hold said bar extension 103 and the parts connected therewith in the position in which they are shown in Fig. 18, when the lock parts are in their initial or starting position. The end of end piece 212 carried by the bar extension 103 has a beveled surface 145 thereon for engagement with the inclined cam surfaces 142 and 143 as hereinafter described.

The cam surface 135 in cooperation with wedge shaped recess 132 and flat surface 137 controls endwise movement of the locking slide 130 to lock the outer body member 66 either to the end plate 140 or to the inner body member 65.

The cam surface 142, in cooperation with the lock control bar 109, governs longitudinal movement of the movable bolt member 64, Fig. 24, and thus cooperates in governing movement of the lugs 98, 99 and 100 into and out of the path of the housing lugs 48, 49 and 50, Fig. 17.

The cam surface 143 in cooperation with the lock control bar 109 governs movement of the bolt member 64 in moving the lugs 98, 99 and 100 into and out of the alignment with the stop lugs 51 to 56 inclusive.

An inclined surface 144 is provided adjacent the cam surface 143 and the clearance space 38 of the end plate 140 is recessed to provide clearance for bar extension 103 and lock control bar 109 as hereinafter described.

The end plate 140 has a stop member 126 provided therein that is adapted to be engaged by a lug 127 which is rigid with and protrudes endwise from the inner body member 65 to limit the rotary movement of said inner body member 65 to substantially one hundred eighty degrees.

In assembling the elements of this lock core, most of which are shown in Fig. 24, it is advised to proceed as follows: with end piece 212 removed and lock control bar 109 in place, telescope member 64 into member 65 and rivet 212 in place. Then with plate 216 and pins 217 removed and locking slide 130 in place, telescope members 64 and 65 into member 66 and rivet member 67 to the end of the member 65. Then slide plate 216 sidewise into place and secure with pins 217. Lastly telescope sleeve 74 of member 63 over shank 75 of member 65 and pin with pins 79 in pin holes 218.

When these parts are telescoped together they form a support of generally cylindrical shape for the reception of a plurality of tumblers or tumblers 146 and a plurality of tumbler spacers 147, both of substantially ring shape. In Fig. 1 I have shown nine tumblers 146 and ten of the spacers 147. Obviously a greater or lesser number of tumblers and spacers may be used. The tumblers 146 are herein also termed tumbler rings but it is obvious that their shape may be widely varied.

The uncombinated tumblers 146 as initially formed are all of duplicate construction. A cross section through one of these tumblers after being combinated with deep notches 152 and shallow notches 153 is shown in Fig. 8. Combinated tumblers must have at least one notch of one variety and may have any number of either or both varieties between the extreme positions shown by notches 152 and 153, Fig. 8. Each tumbler 146 has an inwardly protruding portion 148 that has a plurality of stepped shoulders 149 on one side thereof arranged and shaped so that they look like inverted stair steps when viewed from the position shown in Fig. 8.

Preferably the number of shoulders 149 correspond to one less than the number of increments used in combinating the tumblers of the lock core. In the present illustration, in Figs. 1 to 25 inclusive, I have shown nine of the shoulders 149. Hence ten increments are used in combinating this lock core, and the available combinations of the lock core follow the formula of $10^n$ where $n$ represents the number of tumblers of the lock core. Thus in a nine tumbler lock core of ten increments per tumbler as shown there are one billion combinations available.

The member 148 of each tumbler has an edge 150, positioned opposite to the shoulders 149. This edge 150 is preferably straight and radial and is adapted to be engaged by the shoulder 119 of the part 117 of the outer body member.

Each tumbler 146 is further provided, at a location approximately diametrically opposite from the stepped member 148, with an inwardly extending thickened portion 151 of substantial length, as shown in Fig. 8. Each thickened portion 151 is provided with one or more relatively deep notches 152 and the thickened portion 151 of at least one tumbler of each lock core is provided with a relatively shallow notch 153. Preferably several tumblers 146 of each lock core are provided with one or more of the shallow notches 153 for reasons hereinafter explained. The notches 152 and 153 are the combinated portions of the tumblers and their positions in each instance are determined by the bitting of the key and they are adapted to receive the hereinbefore described lock control bar 109.

The spacers 147 are of L-shaped cross section, as shown in Fig. 1, each of said spacers 147 having a flange 154 that extends over the peripheral portion of one adjacent tumbler and frictionally engages said tumbler member and helps to hold the spacer member and tumbler in a correct position relative to each other. Also each spacer 147 is internally provided with an inwardly protruding lug or pawl 155, shown at the left in Fig. 8, that projects into a groove 156 in the inner body member 65, the groove 156 being clearly shown in Fig. 9. Preferably the lugs 155 are integral with the spacers 147 and have their edges bent over so that said lugs are of U shape in cross section, as shown in Fig. 8. This gives the lugs greater strength and more bearing surface in the groove 156. The lugs 155 connect the spacers 147 with the inner body member 65 in such a manner that all of the spacers 147 will be rotatively moved along with the inner body member 65.

The tumblers 146 and spacers 147 are assembled between the end portion 92 at one end, and the resilient lock ring 123, at the other end, see Fig. 1, and are frictionally held under enough endwise and radial pressure so that rotary movement of the spacers 147 will move the tumblers 146 unless said tumblers are otherwise restrained from movement. Radial friction on the circumferential portions of the tumblers 146 may be provided by the overhanging flanges 154 of the spacers 147, which may be extended lengthwise of the lock core beyond the extension shown to completely infold and hide the tumblers 146 on the outside.

The tumblers 146 and spacer rings 147 are quickly and easily assembled on members 65 and 66 and are as quickly and as easily disassembled, by first removing the lock ring 123 and then block 210. Thus it is easy to remove the tumblers 146 in the event the combination or combinations of the lock core are to be changed.

The overhanging flange 154 of the spacers 147 extend over the peripheral portions of the tumblers 146 and shield and protect said tumblers and prevent them from coming in contact with any of the adjacent parts of the lock core or housing. These flanges may be extended to completely overhang and hide the exterior of said tumblers if desired.

As the bar extension 103 is required to pass downwardly over the cam surface 143 and beyond said cam, for ordinary lock operation, it is necessary to provide the clearance or space 38 in the end plate 140 in order to provide clearance for part 212 carried on the end portion of said bar extension 103. Also when the lock control bar 109 is positioned in its outermost radial position in a set of deep notches 152 the end portion of said lock control bar will just clear the inclined surface 144 and be positioned in the clearance space 38 as the end of bar extension 103 moves beyond cam surface 143, Fig. 6.

The throw means, Figs. 1, 2, 3, 4 and 5 of this lock, is positioned between the plate member 140 and the end 41 of the housing. This throw means includes gears and gear segments that are arranged to provide lost motion before and after the secondary lock-operating cycle, employed to unlock a secondary lock mechanism.

*Key*

A key for operating this lock is shown in Figs. 1 and 25 and cross sections of said key are shown in Figs. 6 to 10 inclusive. This key comprises a blade 180 having the usual lobe 181 on its outer end and having a shouldered portion 182 adjacent the lobe. The portions 180 and 182 are adapted to enter the keyway 78 in the face member 63 and the shouldered portion 182 is adapted to abut against a shoulder 183 in the said face member 63 to position the key longitudinally in the lock and to provide a strong member for transmitting torque.

A notch 184 is provided in the blade 180 a short distance forwardly of the shouldered portion 182 for engagement with the previously described lug 94 on the circular end portion 92, see Figs. 1, 11 and 24. Figs. 10 and 11 both show that this lug 94 is clear of the keyway 78 when the members 64, 65 and 66 of the lock are in the position they will occupy at the time the key is inserted therein or removed therefrom. After the key has been inserted and as soon as clockwise movement of said key is initiated it will be engaged with the lug 94 and cannot thereafter be withdrawn from the lock until it is turned back into the initial or starting positions.

The key blade 180 has the usual side grooves 185 and one edge portion of said key blade 180 is provided with two longitudinally spaced apart notches 186 and 187 for the reception of a separable combinated portion 188 herein referred to as a key bit. Overhanging portions 189 and 190 are provided in connection with the respective notches 186 and 187 to engage with lugs 191 and 192 on the respective ends of the separable key bit 188.

The bitted edge of the key bit is a series of stepped portions 206 which may have abrupt or square corners and which are each of distinctive height and are longitudinally offset from each other the proper distances to cause the stepped portions of the key always to align themselves with the respective tumblers 146 when the key is in the correct lock operating position in the lock. When the tumblers 146 are moved toward the key bit 188 the shoulders 149 on the tumblers engage with the sides of the stepped portions 206 of the key bit and the tumblers are thus positioned by the key bit.

The lugs 191 on the end of the key bit are two in number and are transversely spaced apart to provide a space 205 therebetween for the entrance of a locking lug 193 of a locking member 194, see Fig. 1, that is embedded in the key blade 180. The locking member 194 has two inclined portions 195 and 196 that are guided in the key blade 180 in such a manner as to cause the locking member to be moved toward the key bit 188 when it is moved toward the tip end of the key blade and to be moved away from the key bit 188 when it is moved toward the lobe end of the key blade.

A compression spring 197 in a bore 198 in the key blade presses against one side of a short pin 199 that engages with a lug 204 of the locking member 194. The other side of the lug 204 is engaged by a longer pin 200 that extends to the forward end of the key blade 180 and is adapted to be engaged and actuated by the pin 91 of the part 90 of the lock throw member when the key blade 180 is inserted to its maximum depth into the lock.

A shallow groove 203 is provided in the bottom edge of the separable bit member 188 to receive the top edge of the locking member 192 and thereby cooperate with the locking lug 193 to lock the detachable bit 188 against transverse displacement.

When the key is inserted in the lock core the pin 91 will move into the end of the key, as shown in Fig. 1, and the locking member 194 and locking lug 193 will be moved thereby out of engagement with the groove 203 and lugs 191. When this occurs the separable key bit 188 will be released as respects the key blade and the key blade 180 and key bit 188 can be moved sidewise relative to each other. When the separable key bit 188 is locked to the key blade 180, the lugs 191 and 192 are held beneath the overhanging portions 189 and 190 of the blade, the lug 193 is positioned between the lugs 191 and the locking member 194 is positioned in the groove 203. This binds the bit member firmly and immovably to the key blade and said bit member will not be normally detached from the key blade at any time except when the key is inserted in the lock and turned. Also said key bit will be reengaged with the blade as the key is being removed from the lock.

The combinated portion 206 of the key bit member is narrower than the base portion thereof, as best shown in Fig. 8, to provide on the key bit member, a shoulder 207 that is adapted to be engaged by an overhanging ledge 178 of the body portion 116 of the outer body member 66. The ledge 178 cooperates with the ribs 81 to trap and hold the key bit 188 securely within the outer body member during the operation of the lock.

*Operation*

The lock core mechanism shown in Figs. 1 to 25 may be operated, so as to operate a secondary mechanism through throw member 159 by all keys that have properly combinated detachable bits and which will enter the lock core and align a set of notches, composed of either or both notches 152 and 153, entirely across the series of tumblers 146 therein. These keys may include ordinary operating keys which will operate only one lock of a group of series of locks, or various master and sub-master keys which will operate various groups within the series, and control keys which perform the double function of operating the locks they are made to fit and of removing the primary lock mechanisms or cores of said locks from the lock housings. Thus any of said keys may be made to serve as a control key.

The usual operation of this lock by an operating key will now be described:

A key of proper combination is inserted in the lock core in the usual manner until the stop shoulder 182 rests against the shoulder 183. For this position of the key the key bit 188 will be properly aligned with the tumblers 146 and said key bit 188 will be securely held within the portion 116 of the outer body member 66, as shown in Fig. 8, the ledge 178 of the portion 116 being engaged over the shoulders 207 of the key bit and the ribs 81 engaging with the lower edge portion of said key bit. Also for this position of the key the pin 91 in the lock, Fig. 1, will be engaged with the pin 200 in the key blade 180 and the locking member 194 in said key blade will be moved into releasing position as respects the key bit 188.

To operate the lock, after insertion of the key as described in the preceeding paragraph, said key is turned in a clockwise direction. As the key begins to move clockwise the key bit and outer body member 66 will remain stationary but the inner body member 65 and spacers 147, which are connected with the inner body member 65 through the lugs 155, will be angularly moved with the key. Movement of the spacers 147 will move the several tumblers 146, which are frictionally connected with the spacers 147, until the shoulders 149 of the respective tumblers 146 engage with the stepped portions 206 of the key bit. When each tumbler 146 engages with the key bit it will be stopped and will not rotate any further until the key bit begins to move. Preferably this movement of the key bit and outer body member 66 will begin at the end of about forty degrees movement of the key. I term this forty degrees the pick-up movement as diagrammatically shown in Fig. 19.

It is during this pick-up movement that all of the tumblers 146 are properly positioned for operation of the lock, provided a key having a proper combination is being used. If a key of a wrong combination is being used it can be turned through this first forty degrees of pick-up movement and through the trial zone of operation but cannot be turned beyond the unlocking trial zone because the tumblers 146 will not be properly aligned to receive the lock control bar 109 and further operation of the lock will be prevented.

At the time the key is inserted in the lock the outer body member including the portion 116 shown in Figs. 22 and 23, will be locked to the end plate 140 by the engagement of the portion 131 of locking slide 130 in the recess 132 and by engagement of the edge 134 with the cam surface 135 and by the abutting relation of the end portion 138 of said locking slide 130 against the wall of end flange 86. As long as the outer body member 66 thus remains locked to the housing 40 it cannot be moved rotatively and the key bit 188 will be held in a fixed position while the tumblers 146 are moved into engagement with said key bit.

When the key handle and inner body member 65 begin to move clockwise from the initial or starting position the recess 139 in the end flange 86 begins to move toward the locking slide 130, Fig. 22. By the time the key and inner body member 65 have completed their clockwise movement through the pick-up portion of this cycle the recess 139 will be substantially in registration with the conical end portion 138 of the locking slide 130 but the position of the locking slide 130 will not have changed.

However, when the key and inner body member 65 reach the end of the pick-up movement, Fig. 19, in a clockwise direction the shoulder 128 of the inner body member 65 will contact the shoulder 118, Fig. 8, of the outer body member 66.

Thereafter, upon further movement of the key and inner body member in a clockwise direction, the outer body member will be rotatively moved therewith and the locking slide 130 will be longitudinally moved to the right, as respects the showing in Figs. 22 and 23. This releases the engagement of the locking slide 130 with the end plate 140 and moves the cone shaped end portion 138 of said locking slide 130 into the recess 139 thus locking the inner and outer body members 65 and 66, Fig. 24, together.

Also at substantially the end of the pick-up portion of the stroke, i. e., at the end of forty degrees of clockwise movement of the key and inner body member 65, the end 145 of beveled surface piece 212 pivoted to the bar extension 103, Fig. 18, will begin to move beyond the cam surface 142 and the spring 107 will begin to move the longitudinally movable bolt member 64, Fig. 24, inwardly. This will cause the inclined ribs 112 on the lock portion 87, Figs. 18 and 20, to tend to move the cooperating inclined ribs 111 and the lock control bar 109 outwardly toward the notches 152 and 153 in the tumblers 146. If the key is of a proper combination and the tumblers 146 are properly positioned so that a set of the deeper notches 152 are lined up across the tumblers then the lock control bar 109, which is being urged toward the notches 152 by the spring 107 will drop into the notches 152 and operation of the lock can continue on to the end of the operating cycle, Fig. 19, and will be stopped at the end of said operating cycle.

The trial portion of the cycle during which the spring 107 is urging the lock control bar 109 into the notches 152 is preferably the succeeding twenty degrees beyond the end of the pick-up portion, see Fig. 19, and the operating portion of the cycle is the succeeding sixty degree beyond trial portion. The usual operating keys will only turn the lock core through these three cycles but a control key will turn the lock core through a further control cycle of operation, preferably of sixty degrees and bring said lock core to a position where it may be removed from the lock housing.

Obviously the angles through which the key is turned for pick-up, trial, operating and control may be varied in the design of the lock, the angles herein described being merely illustrative of one set of angles by which this sequence of operations can be satisfactorily carried out.

When the three members 63, 64 and 65, of the core, Fig. 24, first begin to move clockwise from the starting position the stop lugs 98, 99 and 100, Figs. 13, 17 and 24, on the crescent shaped end plate 97 of the bolt member 64 will be in the annular path of the fixed housing lugs 48, 49 and 50, Fig. 17, but can be moved substantially sixty degrees clockwise, see Fig. 13, before they are stopped by the lugs 48, 49 and 50. This makes it possible to operate the lock mechanism through the pick-up and trial portions of the cycle with any key of the type disclosed that can be inserted therein even though the key bit is not cut to the right combination.

However, for the lock to be operated beyond the end of the trial position it is necessary that the bolt member 64, which carries the lugs 98, 99 and 100, should be moved endwise, to the left as respects the showing in Figs. 1 and 17, far enough so that the lugs 98, 99 and 100 will clear of the lugs 48, 49 and 50. The lugs 98, 99 and 100 must be thus in the clear by the time the lock parts have reached the end of the trial position in their clockwise movement.

Also it is necessary that the lugs 98, 99 and 100 should be moved to the left, Fig. 17, without interfering with the housing lugs 51 to 56 inclusive until the end of the operating stroke, at which time the lugs 98, 99 and 100 are in contact with, and stopped by, the three lugs 54, 56 and 52 respectively.

This movement to the left, as respects the showing in Figs. 1 and 17, of the lugs 98, 99 and 100 of bolt member 64 is controlled by three cooperating elements. These elements are, the lock control bar 109, the inclined cam surfaces 142 and 143 and adjacent surfaces of end plate 140, and the spring 107.

The lock control bar 109 must find the notches 152 or notches 153 or a combination of notches 152 and 153 of the tumblers properly aligned before it can be moved into said notches by the spring 107. The inclined cam surfaces 142 and 143 and adjacent surfaces of end plate 140 must control endwise movement of the bar extension 103 and the bolt member 64 and lugs 98, 99 and 100 carried thereby, in such a manner that the lugs 98, 99 and 100 will clear the lugs 48, 49 and 50 and will not interfere with the housing lugs 51 to 56 inclusive until the operation of the lock is completed. If the lock control bar 109 has only dropped into properly aligned deep notches 152 in the tumblers, the lugs 98, 99 and 100 will clear the lugs 48, 49 and 50 and will then be guided past certain of the lugs 51 to 56 inclusive, after which the end piece 212 and bar extension 103 will ride over the inclined cam surface 143 and the lugs 98, 99 and 100 will move into the annular path of the lugs 51 to 56 inclusive and will be stopped by lugs 54, 56 and 52 at the end of the operating period of the cycle.

The dotted lines in Fig. 17, illustrate the paths of movement of the lugs 98, 99 and 100 in by-passing some of the housing lugs 51 to 56 inclusive. For instance, the lug 98 first moves in a straight line until it is substantially alongside of the lug 70. Then, as the inclined cam surfaces 142 at the end of the bar extension 103, Fig. 18, allows the bar extension 103 and bolt member 64, Fig. 24, to move to the left, this lug 98 moves angularly, clockwise and to the left, Fig. 17, until it is in the pathway between the set of lugs 48 to 50 and the set of lugs 51 to 56. Then said lug moves clockwise, as end piece 212 and the bar extension 103 rides on the flat surface of end plate 140, until it has by-passed lug 53. Then, as end piece 212 and the end of the bar extension 103 rides down over the inclined cam surfaces 143, this lug 98 moves angularly, clockwise and to the left, the same being downwardly in Fig. 17, into line with the lug 54 and comes to a stop against the lug 54 at the end of a key movement of one hundred twenty degrees.

In a similar manner the lugs 99 and 100 move simultaneously with the lug 98 to by-pass the respective lugs 55 and 51 and come to a stop against the lugs 56 and 52 respectively.

In a counterclockwise or return movement of the key and lock mechanism the inclined cam surfaces 143 and 142 will cause the lugs 98, 99 and 100 to follow, in a counter-clockwise or reverse direction, the paths just previously described back to the starting position.

Thus in the normal operation of the lock for the purpose of retracting a secondary mechanism a properly bitted operating key is inserted, with the bit uppermost. This key is then turned through an angle of substantially one hundred twenty degrees to first properly align the tumblers and position the lock control bar 109 in the tumbler notches and then to impart a turning movement of substantially ninety degrees to the throw member 159 which protrudes from the end of the lock housing. Thus the sixty degree operating movement of the key produces a ninety degree movement of the throw member 159.

In the pick-up movement of an ordinary operating key, Fig. 19, the key bit 188 will remain stationary and the tumblers 146 will be frictionally moved into engagement with said key bit and a set of deeper notches 152 will be lined up with lock control bar 109 entirely across the set of tumblers.

Upon further clockwise movement of the operating key through the trial portion of its cycle the lock control bar 109 will be moved into the aligned notches 152 thus allowing the movable lugs 98, 99 and 100 to clear the respective housing lugs 49, 50 and 48 so that clockwise movement of the key may be continued through the operating portion of the cycle.

During movement through the operating portion of the cycle the end piece 212 of bar extension 103 will pass over the inclined cam surface 143 and rotation will be stopped at the end of the operating cycle by engagement of the lugs 98, 99 and 100 with housing lugs 54, 56 and 52.

At the time the key begins to move clockwise from the starting position the interrupted gear member 171—172 of the throw mechanism will simultaneously begin to move clockwise from the position shown in Figs. 3 and 4. In the starting position the long teeth 169 of the gear segments 165 are resting on the circumferential portion of the disc member 172 and the end of one shorter tooth 170 of each gear segment 165 is pointed toward the center of interrupted gear member 171 and positioned so that it will move along one of the smooth peripheral surfaces 175 of said interrupted gear member 171.

During clockwise movement of the key through the pick-up and trial portion of its cycle the interrupted gear member 171—172 will move rotatively without turning the gear segments 165 on their axes. At substantially the time the key reaches the end of the trial portion of its movement a short tooth 170 of each gear segment 165 will be engaged by a tooth 174 of the gear member 171 and the gear segments 165 will begin to move rotatively, the long teeth 169 entering the recesses 177 and 176, see Figs. 4 and 3.

These gear segments 165, as illustrated, preferably will be rotated through an angle of substantially ninety degrees while the key and gear member 171—172 are moving clockwise through the sixty degree operating portion of the cycle. The recesses 177 and 176 receive the longer teeth 169 as the gear segments 165 rotate. At the end of about ninety degrees of rotary movement of the gear segments 165 the long tooth 169 of each gear segment 165 will again rest on a peripheral portion of the gear member 172 and will prevent further rotary movement of the gear segments 165 in the event the key is turned beyond the end of the operating portion of the cycle. The only key that can and will be turned beyond the end of the operating portion of the cycle is a control key used for the removal of the lock core from the lock housing, as herein described.

Rotation of the gear segments 165 is transmitted directly to the gear segments 161 which, in the present instance, act through the gear member 160 to rotatively move the throw member 159 through the same angle as the gear segments 165 and 161 but in the opposite direction.

From the above described operation of the throw mechanism it will be apparent that said throw mechanism provides sufficient lost motion at the beginning of the cycle of operation of the key to prevent turning of the throw member 159 while the key and parts of the lock mechanism are being moved through the pick-up and trial portions of their cycle. Also it will be apparent that this throw mechanism will transmit substantially ninety degrees of rotary movement to the throw member 159 while the key and lock parts are moving through substantially sixty degrees of the operating portion of the cycle. Also it will be apparent that this throw mechanism is capable of providing for substantially sixty degrees of lost motion beyond the end of the operating portion of the cycle in the event the lock core is to be removed from the housing. Obviously other desired gear ratios between the key operated throw member 67 and the throw member 159 and degrees of lazy motion both before and after the operating cycle can be obtained by varying the relative sizes of the gear members 161 and 160 and related parts.

This throw mechanism is further adapted to provide corresponding inverse lost motion and rotary motion of the several parts of the throw mechanism as a key in the lock is rotatively moved in a counter-clockwise direction from the end of the operating or control position back to the starting position.

In many types of locks the throw mechanism herein disclosed is enlarged and changed in many ways. For instance the hub of one of the gear segments 161 may be made the main throw member in the secondary lock mechanism in case it is desirable that the throw member be off center as respects the lock housing. Such a set-up is disclosed in U. S. Letters Patent No. 2,138,856, issued December 6, 1938.

When this structure is used the throw pin is aligned on the axis of the lock core and any forcible rotating of core and housing could not unlock the secondary lock.

Any desired degree of master keying and sub-master keying may be provided in this lock by the use of more than one of the deeper notches in any desired number of the tumblers. When master keying is so done it does not reduce or limit the number of possible combinations of the lock but leaves every possible combination usable. In the lock shown in Figs. 1 to 24 one billion different combinations are possible.

*Core removable*

Each lock is constructed in such a manner that the primary lock mechanism or core can be unlocked from the housing by the use of a control key and thus withdrawn from said housing. This makes possible very quick and easy changes of the combinations and easy access for the purpose of replacing or repairing the primary lock mechanism or for the insertion of another type of core.

To provide for removing the lock core from the lock housing I provide in one or more of the tumblers 146 of each lock one or more of the shallow notches 153, Fig. 8. To properly position said shallow notch or notches 153 for removal of the lock core I provide a control key having a key bit 188 shaped so that it will position one or more of the tumblers 146 that have shallow notches 153 with their said shallow notch or notches in alignment with the lock control bar 109. One shallow notch 153 of one tumbler, when properly aligned with deeper notches 152 of the remainder of the tumblers of a lock is sufficient to provide for the operation of a control key in removing the lock core.

When one or more of the shallow notches 153 are thus provided in an aligned group of notches the said shallow notch or notches 153 will limit the outward movement of the lock control bar 109 in a radial direction, Fig. 8, and this will limit the longitudinal movement of the lock member 64, Fig. 24, which carries the plate 97 and lugs 98, 99 and 100.

When the longitudinal movement to the left, Figs. 1 and 17, of the lugs 98, 99 and 100 is thus limited, said lugs 98, 99 and 100 will move clear of the stop lugs 48, 49 and 50 but will be restrained by the lock control bar 109 from moving into the path of the lugs 51 to 56 inclusive. This leaves the lugs 98, 99 and 100 freely movable in the pathway between the set of lugs 48 to 50 and the set of lugs 51 to 56. Under these conditions the key and lock core members 63, 64 and 65 are free to move rotatively through an angle of one hundred eighty degrees from the starting position. At the end of this movement the lug 127 on the end of the tumbler-carrying portion 87 will be stopped by engagement with the fixed stop member 126, Figs. 1 and 6, of fixed end plate 140.

When rotation of the lock core is thus stopped by engagement of parts 127 and 126 the lock core will be preferably in the only position for removal from the housing 40. In this position the lugs 69 to 73 inclusive and the lugs 98, 99 and 100 will all be moved one hundred eighty degrees relative to the housing lugs from the position in which they are shown in Fig. 17, while the lugs 113, 114 and 115 will be relatively moved one hundred forty degrees and all of said lugs will be lined up so that the lock core may be drawn straight out of the housing.

The removal position described in the preceding paragraph is the only position in which the lock core can be removed. For all other positions there will be interference of two or more of the several lugs. It will be noted that the set of lugs 69 to 73 inclusive of the face member, see Fig. 17, are securely engaged behind the lugs 43 to 47 inclusive for all other positions of the core and that said lugs 69 to 73 are backed up by the lugs 48, 49 and 50 for substantially all positions of the core. The disc portion 68 is thus supported against inward movement both by the lugs 48, 49 and 50 and by the shoulder 42.

This makes it extremely difficult to gain access through the lock or to force the same by wrenching, drifting, hammering, or otherwise forcing the face plate inwardly or by, in any way, exerting an outward force on the face plate to force the lock core out of the housing.

Also the tumblers must all be positioned before unlocking trial can be made and unlocking trial of all of the tumbler rings must be made simultaneously during this trial phase while the tumblers of the lock are in inaccessible sealed-off compartments of the lock. This makes it impossible to correctly position the tumblers by any picking method.

*Figures 26 to 35*

Figures 26 to 35 show another type of lock core adapted to interchangeably replace the one of Figs. 1 to 24. It employs the same lock housing 40, the same throw means, the same face member 63, and the same bolt member 64 for carrying the spring 107 and lock control bar 109, as are shown in Figs. 1 to 25, as hereinbefore described.

The lock shown in Figs. 26-35 is of different accommodation than the lock shown in Figs. 1 to 25 in that it is a lock of simpler construction and hence it is a less costly lock to manufacture. Also it has a less number of tumblers therein, is operated by a one piece key and is less secure against picking.

In the interest of brevity many of the parts which are the same in Figs. 26 to 35 as they are in Figs. 1 to 25 are not shown in Figs. 26 to 35. Also some parts in Figs. 26 to 35, which are identical with parts shown in Figs. 1 to 25 are similarly numbered.

The key used in the lock of Figs. 26 to 35 does not require a detachable bit and the lock structure is varied to suit this different type of key.

The lock core mechanism shown in Figs. 26 to 35 comprises three lock core pieces, Fig. 34, designated generally by numerals 230, 231 and 232. These three core pieces cooperate with the face plate and core pieces designated generally by numerals 63 and 64 in Fig. 24 in providing the core of the lock of Figs. 26 to 34.

The core piece, designated generally by 230 in Fig. 34, comprises a core member 233 of generally cylindrical shape having a keyway 78 extending therethrough.

A shank 234 on the outer end of the member 233, corresponds to the shank 75 of the lock core member 65 in Fig. 24. The shank 234 fits into and cooperates with the tubular sleeve 74 of the face plate member 63, Fig. 24, in the same manner as the previously described shank 75. A stepped portion 235, corresponding to stepped portion 85 of part 65, in Fig. 24, is provided on the end of the member 233 around the shank 234. The stepped portion 235 is adapted for cooperation with the end plate 97 of part 64, see Fig. 24. A shank 275, corresponding to shank 89 of part 65, Fig. 24, is provided on the inner end of the core member 233.

Figure 30:
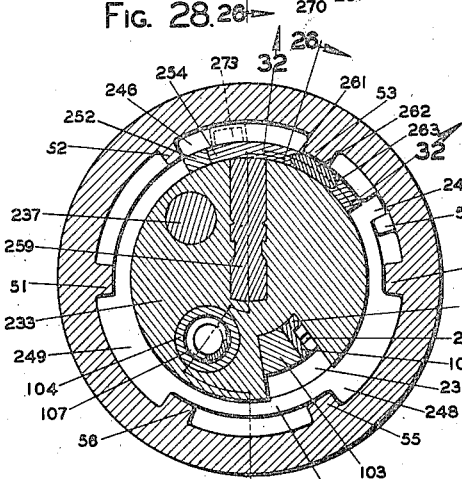
Figure 30 is a view in cross section taken on broken lines 30—30 of Figs. 26 and 32.
Figure 31:
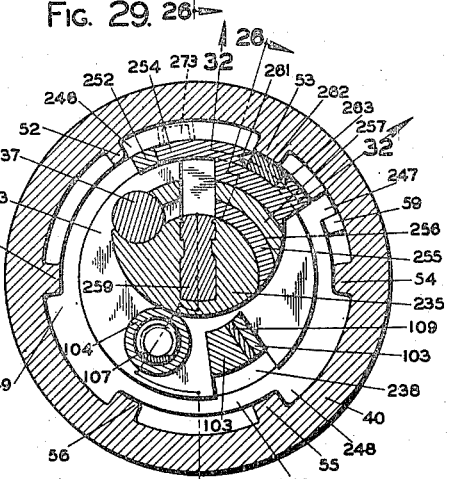
Figure 31 is a view in cross section taken on broken lines 31—31 of Figs. 26 and 32.

An arcuate recess 236 is provided in the side of the shank 234 and a pin 237 protrudes outwardly from the end of the core member 233 as shown in Figs. 30, 31 and 34. The function of the arcuate recess 236 is to facilitate the insertion of the pin 237.

The core member 233 has a longitudinally extending groove 238 in the lower portion thereof, Figs. 28, 29, 30, 31 and 34, for the reception of the bar extension 103 and lock control bar 109 of the lock core part 64 shown in Fig. 24. Inclined ribs 239, Fig. 28, similar to the inclined ribs 112 of Figs. 18 and 20, are provided on the member 233 within the groove 238 for cooperation with the inclined ribs 111 on the lock control bar 109. The bar extension 103 and lock control bar 109 operate in the same manner in the lock shown in Figs. 26 to 34 as they do in the lock shown in Figs. 1 to 24.

Figure 26:
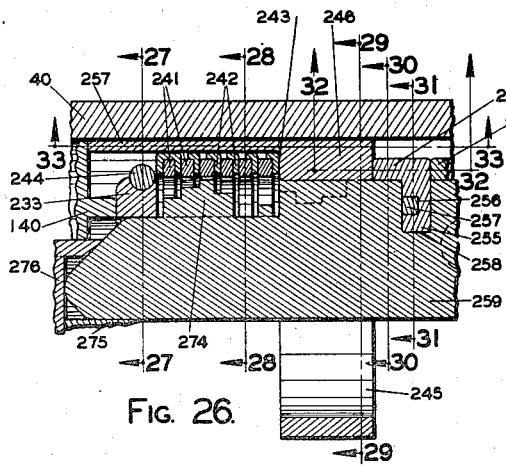
Figure 26 is a fragmentary longitudinal section of a dissimilar type of lock taken on broken lines 26—26 of Figs. 27, 28, 29, 30, 31 and 33.
Figure 27:
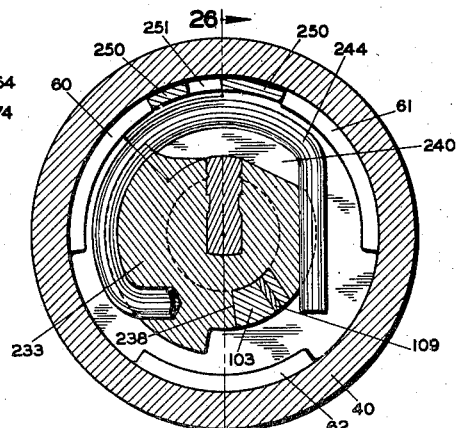
Figure 27 is a view in cross section taken on broken line 27—27 of Fig. 26.
Figure 28:
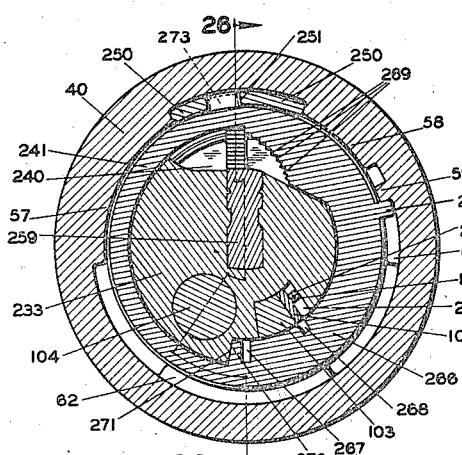
Figure 28 is a view in cross section taken on broken line 28—28 of Fig. 26.
Figure 29:
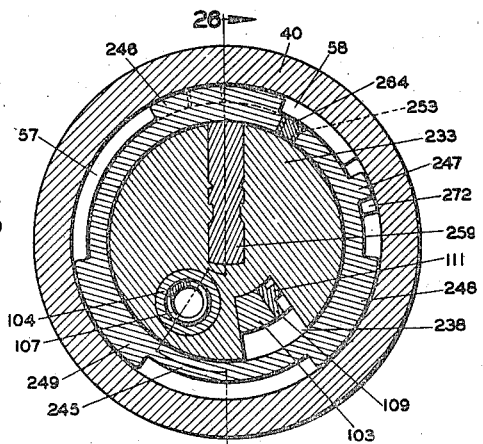
Figure 29 is a view in cross section taken on broken lines 29—29 of Figs. 26, 32 and 33.

The inner end portion of the member 233 is flattened, as shown at 240 in Figs. 27, 28 and 34 to provide operating clearance for a plurality of tumblers 241 that are assembled between spacers 242. The assembled tumblers 241 and spacers 242 are supported at one end by a shoulder 243 of a ring member 245 and at the other end by a resilient snap ring 244, Figs. 26 and 27, and are frictionally engaged with each other in the same manner as the tumblers 146 and spacers 147 of Figs. 1, 7 and 8.

The lock core piece, designated generally by the numeral 232 in Fig. 34, comprises a ring member 245 having a plurality of lug members 246, 247, 248 and 249 provided on the peripheral portion thereof. The lug 246 enters between the housing lugs 57 and 58 and the narrow lug 247 enters between the housing lugs 58 and 59, Fig. 28, when the lock is assembled. This provides strong and rugged supporting means for supporting the ring member 245 against rotation in the event an attempt is made to force the lock.

The ring member 245 has an integral tongue 250 which extends inwardly therefrom and is provided with a slot 251. The tongue 250 is a continuation of the lug 246 and is positioned between the housing lugs 57 and 58, as shown in Fig. 28, when the lock core mechanism is in the housing. The lock piece 232 is thus non-rotatively connected with the housing 40 but can be inserted into said housing and withdrawn endwise therefrom. An outwardly projecting stop lug 252 is provided on the outer end portion of the ring member 245, Figs. 30, 31 and 34, and a V-shaped notch 253 is also provided in the outer end portion of said ring member 245.

The core piece, designated generally by 231 in Fig. 34, comprises a curved plate portion 254 adapted to rest on the peripheral portion of the core member 233 and abut against the stop lug 252, as shown in Figs. 30 and 31, when the parts are in the starting position.

The plate portion 254, Figs. 31 and 34, has an inwardly directed flange 255 that is provided on its inner side with a curved notch 256 for the reception of a curved lug 257 on the end of the core member 233, see Figs. 26, 31 and 34. The flange 255 is adapted to fit within a notch 258 in a key 259, Figs. 26 and 35, or within the notch 184 in the blade 180, Fig. 24, if said blade 180 is used in this lock, as soon as the key is moved clockwise from the starting position. It will be noted that the line of section 26—26 is offset to the right in Fig. 31 at the location where it passes through the flange 255 and lug 257.

The outer side of the curved plate member 254 is provided with a groove 260 that extends transversely of the plate 254 and longitudinally of the lock and has grooved edge walls 261. The groove 260 is adapted to receive a locking slide 262 that has V-shaped edges 263 which interfit the grooved edge walls 261.

The locking slide 262, see Fig. 32, has one V-shaped end portion 264 adapted to fit within the notch 253 in the end of the ring member 245 and another V-shaped end portion 265 adapted to fit within the notch 39 in the end of the tubular sleeve 74.

Each tumbler 241 has a thickened portion 266. One or more notches, Fig. 28, such as the deeper notch 267 and shallower notch 268 are provided in the thickened portion of each tumbler ring. Each tumbler 241 also has a plurality of stepped shoulders 269 for cooperation with a key. Each tumbler 241 further has an internal shoulder 270 for engagement with a shoulder 271 on the core member 233. Each tumbler further has an external stop lug 272 for engagement with the housing lug 59.

Each spacer 242 has an outwardly projecting lug 273 that is positioned within the slot 251 of tongue 250 and holds the spacer non-rotatable.

The key 259 has an integral bit member 274 cut for cooperation with a lock having six tumblers. Otherwise this key is similar to the key shown in Fig. 25, and when the first six notches of the bit member of the key shown in Fig. 25 are cut to the proper combination the key shown in Fig. 25 may be used in the lock shown in Figs. 26 to 34 and will operate this lock in the ordinary manner without having the key bit detached therefrom.

A fragment of a throw member 276 is shown in Fig. 26. This throw member 276 is similar to the throw member 82, 83, 84 shown in Figs. 1, 3, 4, 5 and 24 except that the pin 91 that is used for unlocking the bit 188 from the blade 180 is omitted.

*Operation*

The cycle of operation of the lock shown in Figs. 26 to 34 for lock operation and core removal purposes is the same as the cycle of operation of the lock shown in Figs. 1 to 24 and is illustrated in Fig. 19.

When the key is inserted and turned clockwise through the pick-up portion of the cycle, Fig. 19, the tumblers 241 do not begin to move until they are engaged by the key. By the time the key reaches the end of the pick-up portion of the cycle it will have picked up all of the tumblers 241 as the key bit engaged the shoulder 269, and, if it is a properly combinated key, it will have aligned the notches in all of the tumblers 241 so that the lock control bar 109 can enter said notches.

As the key moves further in a clockwise direction through the trial portion of its cycle the bar extension 103 will be carried beyond the inclined cam surfaces 142, Fig. 18. This will make it possible for the spring 107, Fig. 18, to move the lock core member 64, Fig. 24, and the bar extension 103 endwise, provided that notches 267 and 268 in the tumblers 241 have been properly aligned so that the lock control bar 109 can enter said notches. If the notches in the tumblers 241 have not been properly aligned then the bolt member 64, Fig. 24, can not be moved inwardly by the spring 107 before the end of the trial portion of the cycle and the lugs 98, 99 and 100 will remain in the annular path of the lugs 48, 49 and 50 and rotary movement of the key and lock parts will be stopped at the end of the trial portion of the cycle.

The flange 255 of the core piece 231 has the function of engaging within the notch 184 of the blade 180, Figs. 1 and 25, or the corresponding notch 258 in the key 259, Figs. 26 and 35, depending on which key is used, so as to prevent removal of the key from the lock except when the key is in the starting position. When the key and lock parts are in the starting position the core part 254, 255, Figs. 26, 32 and 34, is locked to the fixed ring member 245 by engagement of the end portion 264 of locking slide 262 in the notch 253 of ring member 245. At this time the other end portion 265 of the locking slide 262 abuts against the flat end portion of the tubular sleeve 74.

As the key is moved clockwise away from the starting position the face member including sleeve 74 moves therewith and, by the time the end of the trial position is reached, the notch 39 in sleeve 74 will have moved into substantial registration with the locking slide 262. At about this same time the pin 237 on the core member 233 will engage with the flange 255 of the piece 231, Figs. 34 and 31, and, upon further clockwise movement of core piece 230, the locking slide 262 will be moved to the right, Fig. 32, into engaged relation with notch 39 and disengaged relation with notch 253. Thereafter during rotary movement of the key and lock parts in the operating and control portions of the cycle the member 231, Fig. 34, will move with the key. As the key is moved counter-clockwise back to the starting position the end portion of the plate portion 254 will contact the stop lug 252, Figs. 30, 31 and 34, at substantially the time the locking slide 262 is opposite the notch 253 and the locking slide 262 will be moved into notch 253 and member 231, Fig. 34, stopped just before the key reaches the starting position thus releasing the key, leaving the key slot unobstructed and leaving the member 231, Fig. 34, locked to the fixed ring member 245.

The core piece 231 thus makes it impossible to longitudinally displace or to remove the key except from the starting position. This facilitates removal of the lock core from the housing by exerting an outward pull on a control key after the control key has reached the end of the control portion of its cycle.

The operation of the operating and control keys in the lock shown in Figs. 26 to 34 inclusive is the same as in the lock of Figs. 1 to 24. If a properly bitted operating key is used in the lock it will align a row of the deeper notches 267 across a set of tumblers. This will allow the lock control bar 109 to move outwardly far enough to position the lugs 98, 99 and 100 in the path of the stop lugs 51 to 56 inclusive, Fig. 17, before the end of the opening portion of the cycle is reached thus stopping the movement of all parts at the end of the operating cycle.

If a properly bitted control key is used it will align a row of notches across a set of tumblers and at least one of those notches will be a shallow notch 268. The presence of a shallow notch 268 or of several of said shallow notches 268 in a line of notches across a set of tumblers will stop the lock control bar 109 in an intermediate position and this will position the lugs 98, 99 and 100 for operation in an annular path between the set of lugs 48 to 50, Fig. 17, and the set of lugs 51 to 56. When the lugs 98, 99 and 100 are thus positioned they will operate through to the end of the control portion of the cycle or throughout substantially one hundred eighty degrees. When the parts have reached the end of the control cycle they are preferably stopped by engagement of a stop lug, not shown, on core piece 230, which corresponds to the stop lug 127, Figs. 1 and 6, with the stop member 126 on end plate 140. In this position all parts of the lock core mechanism are clear of the lock housing lugs so that the core mechanism can be withdrawn from the housing.

The lock shown in Figs. 26 to 34 uses the same throw mechanism as the lock shown in Figs 1 to 24 and said throw mechanism functions in the same manner and will stop rotation of the lock parts at the end of the control cycle if no other stop means is used.

The lock shown in Figs. 26 to 34 also uses the same face member 63 and the same bolt member 64, Fig. 24, and fits within the same housing 40 as the lock shown in Figs. 1 to 24.

The lock shown in Figs. 26 to 34 is also capable of being operated by the blade 180 used in the lock shown in Figs. 1 to 25 although the bit 188 is never detached from the blade 180 when used in the lock of Figs. 26 to 34.

Any number of the less costly locks of the form shown in Figs. 26 to 34 may be used in a locking system where some of the higher grade locks of the type shown in Figs. 1 to 24 are used and the entire system can be set up for the use of control keys and any desired number of master, submaster and operating keys. Also all of the locks will have the same external appearance so that an observer will not know one type of lock from the other.

The number of tumblers in both cores may be varied. I have shown six tumblers 241 in the core of Figs. 26 to 34 thus making it possible to set this lock up to one million different combinations while the lock of Figs. 1 to 24, as shown, has nine tumblers 146 with one million combinations.

Thus I have shown a system of locks having two distinct types of lock cores having certain features in common, but still of structurally different form and action, that are both adapted for interchangeable use in the same system and that will respond to the same keys.

One is unpickable and has one billion key changes, but is more expensive to make than the other which theoretically, at least, is susceptible of picking and only has one million key changes.

In any system of locks there are certain locks requiring greater security than others in which the better type of lock cores can be installed and there are other locks where lesser security will suffice where cheaper lock cores will be all that is required.

Thus there is a great need for just such a system of locks where varying degrees of security can be afforded at varying and commensurate costs, by having a variety of cores to use selectively.

To give the very greatest security, where such security is demanded, it is contemplated to leave additional metal on the exposed parts of cores and housings and manufacture the superior type or types of cores and housings therefor out of superior materials such as hardened stainless steel.

Thus can be masterkeyed together locks of varying security and cost to provide a most desirable system of locks the cores of which can be readily interchangeable as varying degrees of security are required in any locks of the system.

I contemplate making other types of cores also that will be adaptable for interchangeable use in this system of locks as well as variation in the key design.

I also contemplate the setting up of other more or less similar systems of locks employing variations in the housings, cores and keys.

In instances where great security is not required or desired such as in toilet locks, I contemplate using a number of plain dummy rings without any centerwardly extending portion or portions in place of regular tumblers, so as to be passed by greater numbers of keys.

It is very desirable, in a master-keyable system of locks, to so construct the locks that the dismantling of a few, or, for that matter, any number of locks of said systems will not reveal the master key or control combinations of the system, for a skilled person with that knowledge can easily make a key that will give him access to any locks of the system.

Ramifications of combination numbers, ordinarily used in master-keying, where two or three out of a total of say ten increments are used in each tumbler thereof, ordinarily affords ample security for hiding away the combination number of the master key, but where a single control key is used, for core removal and interchange, for the entire system, in systems utilizing the lock-controlled assembly feature, with a single control number in each tumbler that is easily distinguished as such, as in pin tumbler locks with a separate control shear line, the dismantling of a single lock would reveal the control number of the entire system.

Hence, it is expedient and has been the practice in the art to use dummy combination settings in addition to the correct ones to thus hide away, the same as in the master key set-up, the correct combination numbers, in a maze of selective possibilities.

This is not altogether satisfactory, for with the increased use of dummy numbers, the security of the lock is correspondingly impaired.

The novel means used and method advocated in this invention, remedies this undesirable feature and gives complete relief from this element of insecurity.

The unique structure of the locks of this system makes it possible to combine the operating and control combinations in any tumblers to thus very effectively hide away the control combination and still only use one control number in each tumbler and even dispense with the use of control combination in some of the tumblers entirely.

This is effected by having deep notches for lock-operating purposes and shallow notches for control purpose.

Thus only one shallow notch in any one of the tumblers lined up with either kind of notches in all other tumblers is all that is required for control operation.

Thus to absolutely hide away the control number of the system, it only becomes necessary to observe the following:

Assume that the control combination number of a system of locks having nine tumblers each, such as is shown, is: 462,873,517.

In the first and every recurring ninth lock of the system use only a Number 4 shallow notch in the first tumbler.

In the second and every recurring ninth lock of the system thereafter use only a Number 6 shallow notch in the second tumbler and so on to the ninth lock of the system, and every ninth recurring one thereafter, which employs a Number 7 shallow notch. The rest of the control number uses submaster, private or additional deep notches.

Now to hide this combination pattern away so as not to disclose it, it is only necessary to put one dummy combination number in each of the other tumblers interspersing them equally among the other digits, so that all digits are used and reoccur with approximately the same frequency in the various locks of the system.

Thus each lock would only have 9 shallow notches, one for each tumbler, eight of which are dummies that ramify through the whole range of unused numbers thus giving no indication whatsoever of which one and in which tumbler is the right one and which ones are the dummies.

Thus in a system of few or many locks, the same baffling maze of substantially equal frequency of use of each digit presents itself to the intruder that leaves him with no means of finding the control number of the system.

This novel means and method of hiding away the control combination is of very great value in preserving the greatest possible degree of security.

Having thus described my invention, what I claim as new and desire to secure by Letters Patent is:

1. In a lock, a housing and a key-removable core in said housing, means in said lock limiting the rotary movement of said core, for lock unlocking purposes, to a prescribed angle and permitting and requiring a greater angular movement in the same direction for removing the core from the housing.

2. In a lock, a housing, core means movable through a predetermined angle in said housing for lock unlocking purposes and through a further angle, in the same direction, for removing the core from the housing, and cooperating lugs on said core and in said housing adapted to limit the rotary movement of the core for said lock unlocking purposes.

3. In a lock having a lock controlled assembly feature, said lock consisting of a housing, a core having a face member, said core being releasably retained in said housing, a core receptacle in said housing of cylindrical form having annular rows of inwardly extending lugs, said lugs being adapted to cooperate with lugs on the face member of said core to releasably retain said core in said housing.

4. In a lock having a lock controlled assembly feature, said lock consisting of a core having a bolt member, said core being releasably retained in a housing, a core receptacle in said housing of cylindrical form having annular rows of inwardly extending lugs, said lugs being adapted to cooperate with lugs on a bolt member of said core to control the rotative movement of said core in said housing.

5. In a lock having a lock controlled assembly feature, said lock consisting of a core having a face member and a bolt element, said core being releasably retained in a housing, a core receptacle in said housing of cylindrical form having annular rows of inwardly extending lugs, said lugs being adapted to cooperate with lugs on the face member of said core and also with lugs on the bolt element of said core to control the assembly and disassembly of said cores into and from the said core receptacle, respectively.

6. In a lock having a lock controlled assembly feature, said lock consisting of a core releasably retained in a housing, the combination of elements comprising a core receptacle in said housing of cylindrical form having annular rows of inwardly extending lugs, and a lock throw transmission unit in said housing providing lazy motion at the beginning and ending of the core's fullest unlocking movement to provide pick-up, unlocking-trial, lock-operating and core-removal zones of unlocking movement.

7. In a lock having a lock controlled assembly feature, said lock consisting of a core releasably retained in a housing, a core receptacle in said housing of cylindrical form having annular rows of inwardly extending lugs, said lugs being adapted to cooperate with lugs near the face end of said core to releasably retain said core in said housing.

8. In a lock having a lock controlled assembly feature, rotatively movable lock core means including a face member, a lock housing adapted to receive said lock core means, lugs on said face member, and lugs in said housing cooperating with the lugs on said face member locking said core means in said housing.

9. In a lock having a lock controlled assembly feature, core means comprising a face member, a housing adapted to receive and permit rotative movement of said core means in said housing, an annular row of face lugs on said face member, and two annular rows of housing lugs in said housing positioned to receive therebetween the said face lugs and to permit the rotative movement of said face lugs and to firmly support said face lugs against longitudinal movement of the said core means in either direction in said housing.

10. In a lock having a lock controlled assembly feature, a housing, a rotatable face member, restrained against endwise movement in said housing, a longitudinally movable member in said housing non-rotatively engaged with said housing when adjacent said face member and rotatable in the housing when moved away from the face member, and strong and rugged torque resisting means connecting said longitudinally movable member and said face member when the movable member is in a position adjacent the face plate member.

11. In a system of locks, in lock-controlled assembly, the combination of elements comprising a housing, a core adapted to respond to a one piece key, another core adapted to separate a two piece key in the operation thereof, each said core being adapted to be selectively assembled into said housing and form therewith a lock of the system.

12. In a system of locks, in lock-controlled assembly, the combination of elements comprising a housing, a core adapted to respond to a one piece key, another core adapted to separate a two piece key in the operation thereof, each said core being adapted to be releasably retained in said housing by key means to form therewith a lock of the system.

13. In a system of locks, in lock-controlled assembly, the combination of elements comprising a housing, a core adapted to respond to a one piece key, another core adapted to separate a two piece key in the operation thereof, outwardly-extending lugs arranged around each of said cores, inwardly-extending lugs in said housing, and key means adapted to selectively cooperate with said lugs of the said housing and respective core to releasably retain either of said cores in said housing in the formation of a lock of the system.

14. In a locking system having lock-controlled assembly, the combination of elements comprising a housing, a core of one structural type, a core of another structural type, tumblers and a key having a bit, the said cores of one and another type being adapted to selectively and interchangeably complement said housing in the formation of a lock of the system, the said core of one type having tumbler-moving means adapted to move the said tumblers into operative engagement with the said bit, said bit being held stationary in said lock and the said core of another type having bit moving means adapted to move the said bit into operative engagement with said tumblers, said tumblers being held stationary in said lock.

15. In a locking system having lock-controlled assembly, the combination of elements comprising a housing, a core of one structural type, a core of another structural type, tumblers, a key comprising a handle and a detachable bit, and another key having a handle and a bit integral therewith, the said core of said one type having a two-part keyway adapted to separate the said detachable bit from its handle in the operation of the lock and the said core of another type having a keyway adapted to utilize the said key having the bit integral with the handle in the operation of the lock.

16. In a system of locks having lock-controlled assembly, the combination of elements comprising a housing, a core receptacle in said housing, housing lugs in said receptacle, a core of one structural type, a core of another structural type, core lugs on said cores, said cores being adapted to selectively and interchangeably fit and function in said housing, said housing lugs being adapted to interlock with the core lugs of either said core to unite the respective core with the said housing in the formation of a lock of the system.

17. In a system of locks having lock-controlled assembly, the combination of elements comprising housings of various types having core receptacles, housing lugs in said core receptacles, cores of structurally different types having core lugs thereon, said core lugs and said housing lugs being adapted to interlock to releasably retain any said core in any said housing to jointly form a lock of the said system.

18. In a system of locks, in lock-controlled assembly, the combination of elements comprising various housings, each housing having a core receptacle with a face end, cores of structurally different types, each core having a face end, inwardly-extending lugs arranged in a circular pattern within said core receptacle of each housing near the face end thereof, outwardly-extending lugs arranged in a circular pattern around about each said core near its face end, said inwardly and outwardly extending lugs of any said housing and any said core respectively, being adapted to releasably retain the respective core in the respective housing to thus form a lock of the system.

19. In a system of locks, in lock-controlled assembly, the combination of elements comprising various housings, each having a core receptacle with a face end, cores of structurally different types each having a face end, inwardly-extending lugs arranged in a circular pattern within the core receptacles of the housings near the face ends thereof, outwardly-extending lugs arranged in a circular pattern around about each said core near its face end, and key means adapted to cooperate with said inwardly and outwardly extending lugs to releasably retain any core in any housing in the formation of a lock of the system.

FRANK ELLISON BEST.

REFERENCES CITED

The following references are of record in the file of this patent:

UNITED STATES PATENTS

| Number | Name | Date |
| --- | --- | --- |
| 1,905,639 | Jacobi | Apr. 25, 1933 |
| 1,947,443 | Bargman | Feb. 20, 1934 |
| 1,964,787 | Voight | July 3, 1934 |